United States Patent [19]

Nakamura et al.

[11] 4,286,375
[45] Sep. 1, 1981

[54] METHOD OF MANUFACTURING CORELESS ARMATURE

[75] Inventors: Yoshimitsu Nakamura, Settsu; Masami Otada, Shijonawate, both of Japan

[73] Assignee: Matsushita Electric Works, Ltd., Osaka, Japan

[21] Appl. No.: 80,678

[22] Filed: Oct. 1, 1979

[30] Foreign Application Priority Data

Sep. 29, 1978 [JP] Japan ................... 53-120850

[51] Int. Cl.³ .................................. H02K 15/02
[52] U.S. Cl. ................................ 29/597; 29/516; 29/598; 310/42; 310/234
[58] Field of Search ............... 29/597, 598, 515, 516; 310/42, 234, 237, 265, 266

[56] References Cited

U.S. PATENT DOCUMENTS 4,110,901  9/1978  Nakamura et al. ............. 29/598
4,200,971  5/1980  Shimizu et al. ................. 29/598

*Primary Examiner*—Carl E. Hall
*Attorney, Agent, or Firm*—Burns, Doane, Swecker & Mathis

[57] ABSTRACT

An improved method of manufacturing coreless armatures typically for coreless motors, according to which a coreless cylindrical coil and an insulative disk member carrying commutator segments and rotary shaft are mechanically strongly coupled together without any adhesive agent, is provided. A radially inward compressive force is applied to the outer periphery of the coil within which the disk member is inserted at position for the coupling until coil windings partly bulge inwardly to clamp the peripheral edge of the disk member whereas a substantial part of the windings is compressed dense and into a smooth cylindrical shape.

5 Claims, 9 Drawing Figures

METHOD OF MANUFACTURING CORELESS ARMATURE

This invention relates to a method of manufacturing coreless armatures and, more particularly, to improvements in the method of manufacturing the coreless armature which comprises generally a cylindrically wound insulation-coated coil as a main armature body and a commutator carrying plate member for securing a rotary shaft of the armature at the coaxial position in the cylindrical coil and carrying thereon a commutator.

Conventional coreless armatures of the kind referred comprise, typically as shown in FIG. 1, a main body 1 of a cylindrical coil and a disk-shaped commutator-carrying member 3. The latter carries on one surface a plurality of commutator segments C and supports or integrally secures at the center on the other surface a rotary shaft 2 endwise. The disk-shaped member 3 is coupled to the cylindrical main body 1 in such manner that the member 3 is inserted inside the main body 1 and disposed adjacent an axial end edge of the cylindrical body 1 but with a small, substantially uniform clearance maintained between the segment-carrying surface of the member 3 and the axial end edge of the body 1. The distance is to be enough for allowing a bonding agent to be applied to the inner periphery of the body 1 and to the opposing periphery of the member 3 and the agent is thus applied by letting it run down to these opposing peripheral parts to couple the body and member together.

In the manufacturing method employing the bonding agent as described above, there have been certain problems typically as will be disclosed in the following.

Firstly, one of the problems is that, in performing the applying work of the bonding agent by letting it run down to the opposing peripheral parts of the cylindrical main body and disk-shaped member for bonding them together to form the armature, it has been practically impossible to apply the agent uniformly over the entire parts with respect to the axial center of the armature. This is due to the fluidity specific to the bonding agent and as a result the dynamic balance of the armature has been unable to be well maintained. Hence undesirable vibration of electric motor in which the armature is employed has been rendered remarkably larger, leading to shorter operative life of the motor. In the case when the rotational speed of the armature or motor is attempted to be increased, the vibration is to be increased by a squared multiple of a multiple by which the rotational speed is increased. That is, in case the speed is made three times higher, the vibration is caused to increase nine times larger, whereby the life of the motor is caused to be one nineth. Thus the lowered dynamic balance of the armature inherently due to the use of the bonding agent has been a bar to the attempt of attaining a high speed rotation of the motor while its operative life as well has been adversely influenced. Therefore, the lowered dynamic balance has been the most remarkable problem that has had to be solved in manufacturing the armature of the kind referred to.

Second, the use of the bonding agent has been a cause in troubles of motors or a deterioration in the yield of production since the bonding agent having a fluidity has been apt to flow out to the surface of the respective commutator segments to impair their contacting property.

Another problem has been that, so long as the bonding agent is employed for the coupling between the main armature body and the commutator-carrying member, efforts have been required for controlling or administrating the quality or such property of the agent, specifically the fluidity, in order to maintain adequate characteristics thereof for the manufacture. Also, the step of applying the bonding agent to the desired position by letting it run down continuously has been difficult to interrupt during the operation.

A further problem has been that the coupling between the main armature body and the commutator-carrying member has been completed by interposing a plastics material between metallic members or directly adhering the plastics material to the metallic member so that the coupling has been mechanically insufficient as compared with a coupling between the metallic members.

The present invention has been suggested in view of these problems in the conventional coreless armatures as well as in the method of manufacturing the same. According to the present invention, the problems have been effectively solved by inserting the commutator-carrying disk-shaped member into the cylindrical coil forming the main armature body to dispose the member to a predetermined position on the inner periphery of the coil, and pressing the coil so that respective turns of coil-forming wire will be caused to project on both surfaces of the commutator-carrying member along its peripheral edge to hold the member at the edge thereof by thus formed projections of the coil and thus mechanically couple the cylindrical coil and disk-shaped member together.

A primary object of the present invention is, therefore, to provide an improved method of manufacturing the coreless armature which is high in dynamic balance.

Another object of the present invention is to provide an improved method of manufacturing the coreless armature with a high yield of production.

A further object of the present invention is to provide an improved method of manufacturing the coreless armature which is high in the coupling force between the cylindrical coil and the commutator-carrying member.

A related object of the present invention is to provide an improved method of manufacturing the coreless armature which is highly durable against high speed rotations.

The present invention shall now be explained in detail with reference to accompanying drawings, in which.

Figure 1:
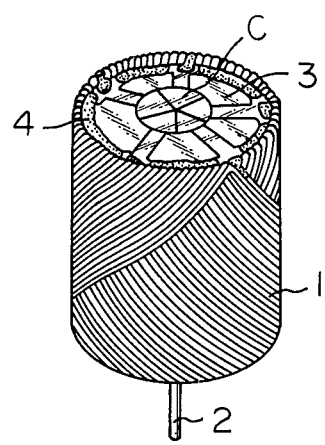
FIG. 1 is a perspective view of a conventional coreless armature.
Figure 2:
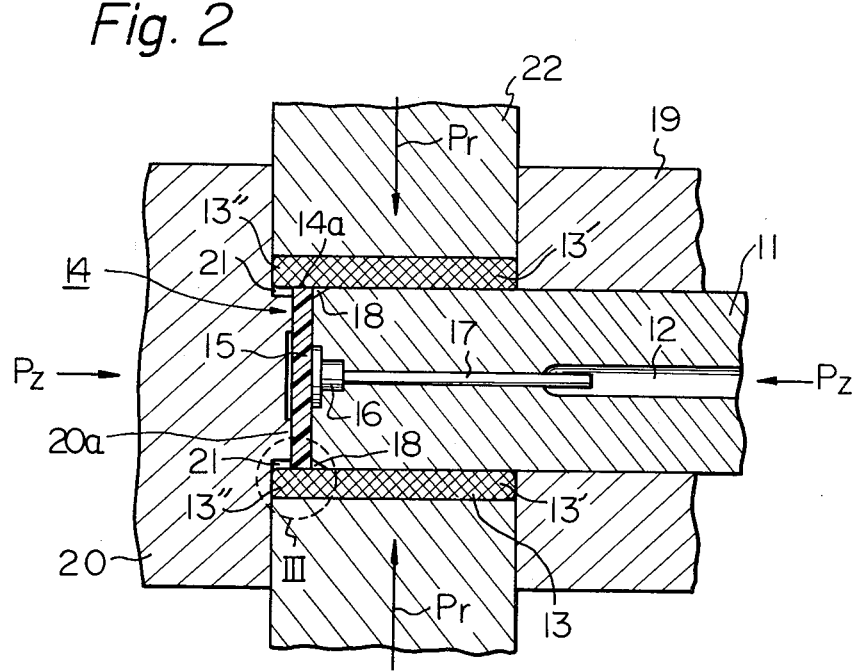
FIG. 2 is a schematic view showing in section an example of a device for performing the method according to the present invention.
Figure 3A:
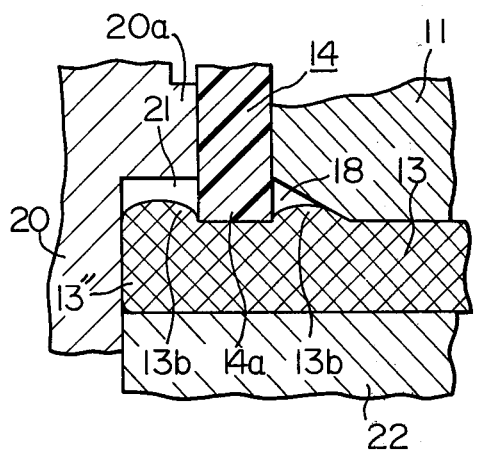
FIGS. 3A and 3B are fragmentary sectioned views in a magnified scale of a part denoted by a cicle III in FIG. 2 for showing sequences during the pressing step according to the present invention.
Figure 3B:
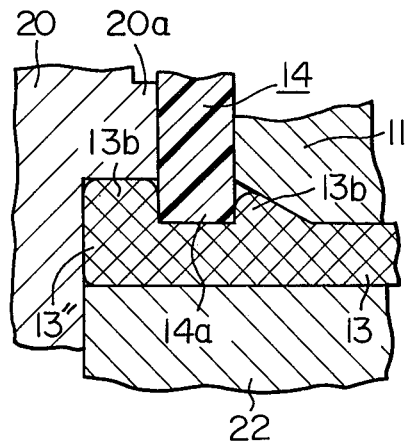
Figure 4:
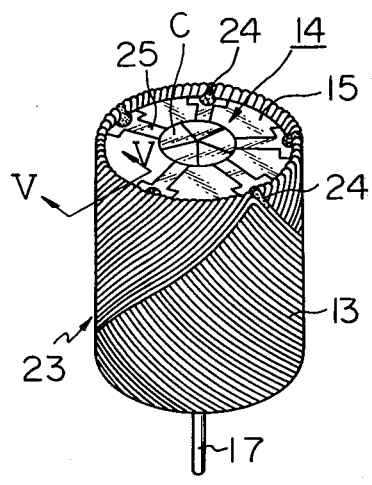
FIG. 4 is a perspective view of an example of the coreless armature manufactured according to the present invention with the device shown in FIG. 2.

Referring now to FIGS. 2, 3A and 3B showing an exemplary device performing the method according to the present invention, 11 is a columnar mandrel substantially of a diameter corresponding to the inner peripheral diameter of the armature to be made, and this mandrel 11 is chamfered or tapered at an end edge and having an axial through hole 12. A main armature body 13 comprising a preliminarily cylindrically wound coil is fitted around the tapered end of the mandrel 11 so as to have the cylindrical coil 13 projected partly out of the mandrel on the side of an axial end 13" of the coil. A separately prepared commutator-carrying member 14 comprises generally a disk 15 of an electrically insulative plastics and having substantially the same diameter as the inner diameter of the cylindrical coil. This member 14 is inserted inside the projected part of the coil 13 so as to be positioned at its predetermined coupling position to the cylindrical coil 13 and to be vertical with respect to the axis of the coil. In this case, one surface of the disk 15 opposite to the other surface on which a plurality of commutator segments C are secured as seen in FIG. 4 abuts an end surface of the tapered end of the mandrel 11. A metallic rotary shaft 17 secured at an end to the center of the disk 15 by means of a metallic boss 16 is inserted in an axial hole of a complementally shape to the boss 16 and shaft 17 and communicates with the hole 12. The tapered end edge of the mandrel 11 defines a tapered ring-shaped space 18 in cooperation with the inner periphery of the coil 13 and the other surface of the disk 15. The mandrel 11 is axially slidably held by a ring member 19 which is positioned to abut, by means of its surface perpendicular to the axis of the mandrel, against the other axial end 13' of the coil 13 to restrict its movement. An axially moving die 20 having a main surface vertical to the axis of the mandrel 11 is brought into aboutment with the axial end 13" of the coil 13. This die 20 has a short cylindrical and ring-shaped projection 20a provided to be coaxial with the mandrel 11 and to have an outer diameter slightly smaller than that of the manrel 11 as well as smaller than the inner diameter of the coil 13. At the position where the surface of the die 20 abuts the end 13" of the coil, the end surface of the projection 20a abuts the commutator-carrying surface of the disk 15. Thus another ring-shaped space 21 is defined between the outer periphery of the projection 20a and the inner periphery of the coil 13 adjacent its axial end 13" and between the vertical surface (end surface) of the die 20 and the commutator-carrying surface of the disk 15. Around the outer periphery of the thus positioned cylindrical coil 13, radially inward pressing dies 22 are disposed defining a cylindrical inner surface of a diameter slightly smaller than the outer diameter of the cylindrical coil 13. The pressing dies 22 are of a thickness in the axial direction of the coil 13 as well as the mandrel 11 substantially equal to or very slightly smaller than the axial length of the preliminarily cylindrically wound coil 13 in the state just fitted on the mandrel and before processed according to the present invention.

In performing the method according to the present invention with the above arrangement, a pressure force acting in the axial directions of the cylindrical coil 13 is applied via the mandrel 11 and axially moving die 20 to the coil 13 and disk 15 as denoted by arrows Pz in FIG. 2. Another pressing force acting in all inward radial directions of the coil 13 is applied through the dies 22 to the outer periphery of the coil 13 as indicated by arrows Pr also in FIG. 2. The pressure Pr thus applied compresses the cylindrical coil 13 radially inward against the periphery of the mandrel 11 and the peripheral edge 14a of the disk 15, and the respective wound turns of the thus compressed coil 13 are normally urged to expand endwise in the axial directions of the coil to increase its axial length. However, as the respective axial ends 13' and 13" of the coil 13 abut the vertical surfaces of the ring member 19 and moving die 20, respectively, under the pressure Pz applied by the die 20, such endwise expansion of the coil 13 in its axial directions is restricted by the member 19 and die 20. As the radial compression of the coil 13 with the pressure Pr advances under such endwise restrictions as above, only the compressed coil turns at a part of the coil 13 adjacent the end 13" as denoted by a dotted-circle III in FIG. 2, are caused to expand or bulge radially inward into the respective ring-shaped spaces 18 and 21 at parts 13b on both side surfaces of the disk 15 of the commutator-carrying member 14, as schematically shown in FIG. 3A. These bulged coil parts 13b finally clampingly hold the peripheral edge 14a of the member 14, as similarly shown in FIG. 3B, whereby the coil 13 of the main armature body and the commutator-carrying member 14 are coupled together mechanically tightly. During this compression, the coil turns in the other part of the coil 13 (i.e., other than the part III) are caused to be transformed from their original round shape (in section) to a generally rectangular shape so as to delete respective spaces between adjacent ones of the coil turns, so that winding density of the main armature body of the coil can be made substantially the highest.

If a hot-melting type fusion bonding agent is applied to the entire surface of the coil 13 prior to the above described pressing work and the pressing is performed under a condition of heating the coil to a temperature high enough for melting the agent, the respective coil turns are mutually tightly bound together by the melted agent. At the same time the coupling strength between the peripheral edge 14a of the member 14 and the coil turns clamping the edge 14a is also increased by the agent.

Referring to FIG. 4 showing an example of the armature 23 manufactured as described in the above, the commutator-carrying member 14 carries, on its surface on the side of the adjacent axial end 13" as seen in FIG. 2, a plurality of the commutator segments C arranged in the central area of the disk 15. The respective segments are connected through respective radially extending leads 25 also carried on the disk 15 to each of connecting parts 24 of the coil 13 which correspond to so-called tappings for distributing a source current to respective zones of the coil and respectively provided at the axial end 13". In this case, at least one of the connecting parts 24 comprises starting and terminating ends of the coil which are insulation-free and twisted and soldered together. This particular connecting part 24 is disposed during the pressing work within the ring-shaped space 21 shown in FIGS. 2 and 3. Therefore, the particular connecting part 24 can be effectively prevented from being subjected to such extreme transformation as that exerted to the coil turns in the other part of the coil 13, i.e., other than the part III shown in FIG. 2 or 3, any problem due to layer-short-circuiting apt to be caused by the extreme transformation at the connecting part 24 can be avoided.

Figure 5:
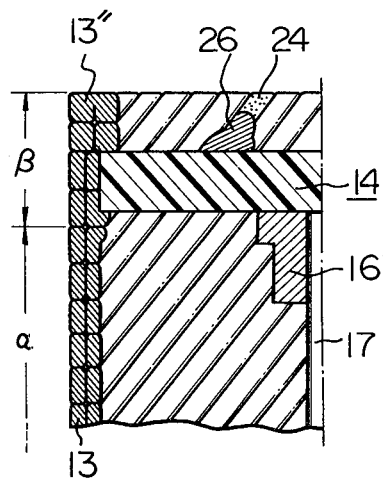
FIG. 5 is a fragmentary magnified view of a part of the armature shown in FIG. 4 as sectioned along line V—V therein.

When references are made to FIG. 5, the above described features of the present invention will be made more clear. In this fragmentary sectioned view, illustrations of the commutator segments C and their leads 25 are omitted since they are formed on the disk 15 of the commutator-carrying member 14 in a very thin conductive metal layer. However, the leads 25 are electrically connected to the opposing connecting parts 24 of the coil 13 by means of a soldering 26. It is seen that the respective turns of the coil wire in the main body part are denoted by "α" of the coil 13 which is subjected to the full radial compression between the mandrel 11 and the dies 22 as shown in FIG. 2. These turns are extremely compressed to cancel the spaces between the respective turns and the body part "α" is rendered to be of a high winding density. The latter the turns in the coupling part adjacent the axial end 13″ of the coil, which is denoted by "β" and corresponding to the area shown by the circle III in FIG. 2, are less deformed since these turns are allowed to escape into the respective ring-shaped spaces 18 and 21, so that the winding density in the part "β" will remain relatively low.

Figure 6:
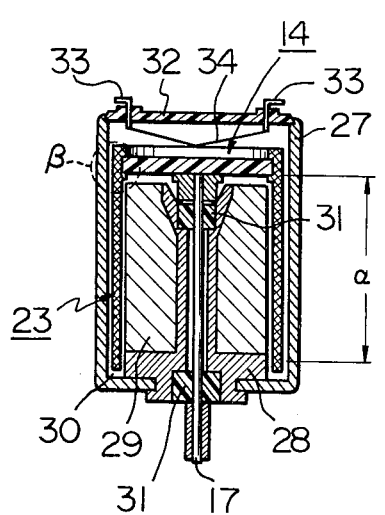
FIG. 6 is a vertically sectioned view of a coreless motor employing the armature of FIG. 4.

A coreless motor employing the armature 23 thus prepared is shown in FIG. 6, in which the armature 23 is disposed with its main body part "α" of the coil 13 within a cylindrical magnetic gap 30 defined between the inner periphery of a cup-shaped stator yoke 27 of a magnetic material and the outer periphery of a cylindrical permanent magnet 29 fixed to the bottom of the yoke 27 through a fixing member 28 of a magnetic material. In this state of the coil 13, the rotary shaft 17 of the armature is born by non-magnetic shaft-bearings 31 on the axis of the magnet 29 so that the commutator segments C on the other surface of the commutator-carrying member 14 will be in contact with power supply brushes 34 connected to the terminals 33. The latter are held by an insulative plate 32 covering the top opening of the cup-shaped yoke 27. Thus the source current fed through the terminals 33, brushes 34, commutator segments C and leads 25 to the coil 13 causes the armature 23 to rotate with the shaft 17 as the center.

Figure 7:
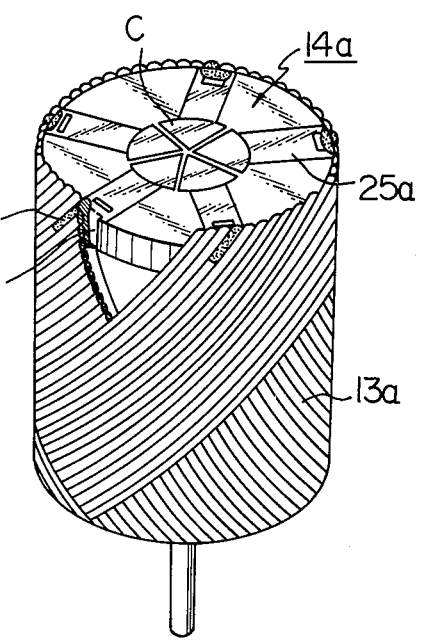
FIG. 7 is a perspective view with a part removed of another example of the armature manufactured by the present invention.
Figure 8:
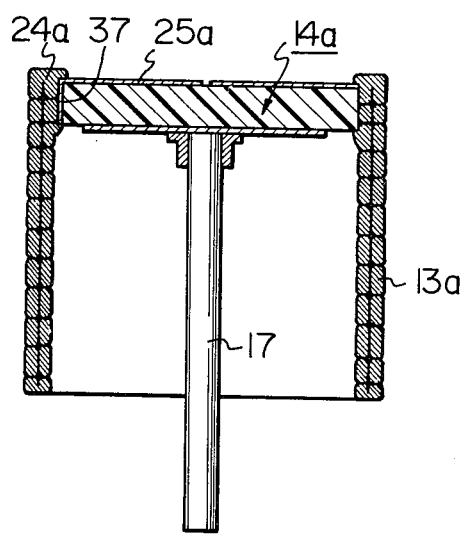
FIG. 8 is a vertically sectioned view of the armature of FIG. 7.

In FIGS. 7 and 8, there is shown another example of the armature according to the present invention, in which the disk of the commutator-carrying member 14a is provided with peripheral recesses 36 at radially extended end positions of the leads 25a respectively connected with each of the commutator segments C. An electrically conductive metal layer 37 is provided at the bottom of each of the peripheral recesses 36 preferably by means of a through hole plating so as to be continuous to the respective leads 25a. The respective connecting parts 24a of the coil 13a at which the inner conductor of coil wire is exposed with the insulation coating removed are disposed to oppose each of the metal layers 37 in the recesses 36 when the member 14a is inserted into the position within the coil 13a as has been disclosed with reference to FIG. 2. The same pressing work as in the case of FIG. 2 is performed and, then, the connecting parts 24a and adjacent coil turns are caused to be compressed to bulge into the spaces 18 and 21 as well as into the recesses 36, whereby the exposed conductor at each of the connecting parts 24a are urged to be into contact with the conductive layer 37 in the recess 36. In the case of this example, therefore, the mechanically strong coupling between the cylindrical coil 13a and the commutator-carrying member 14a by the pressing work performed in the same manner as in the case of FIG. 2. This coupling, which is effective specifically in the axial directions of the coil or armature due to the both side clamping of the disk 15 with the bulged coil parts 13b, is further strengthened with respect to the rotary torque acting in the peripheral directions of the coil by means of the connecting parts 24a and their adjacent coil parts urged to bulge into the recesses 36. At the same time, further, a simultaneous electric connection of the coil's connecting parts 24a with the commutator leads 25a through the conductive layers 37 in the recesses 36 can be achieved, whereby the soldering step for such connection required in the case of FIGS. 4 or 5 may be effectively omitted.

According to the present invention in its one aspect, therefore, a strong mechanical coupling between the main armature body comprising the cylindrical coil and the disk member carrying the commutator and rotary shaft can be well attained by compressing the coil winding turns so as to cause them to partly bulge over to the both surfaces at the peripheral part of the disk member so as to mechanically tightly clamp the disk, without using any adhesive or bonding agent. The bulged size of the coil parts thus clamping the disk can be rendered to be uniform over the entire periphery of the armature since the bulging is caused in the state of restricting it by means of the ring-shaped spaces defined in the pressing device. Thus, the dynamic balance of the armature can be made the optimum and the armature can be made highly durable against the high speed rotation for long periods. According to the present invention in the other aspect, the mechanical coupling is further strengthened with respect to the torque acting in the peripheral directions of the armature by means of the additional bulging of the coil parts into the peripheral recesses at the periphery of the disk member. Such bulging, specifically of the coil's connecting parts into the peripheral recesses having the conductive layer in the disk member, performs the simultaneous electric connection of the commutator with the coil, whereby the soldering step for the connection may be eliminated to simplify the manufacturing method.

What is claimed is:

1. A method of manufacturing a coreless armature comprising, coupling a cylindrically wound coil having at one of axial end edges a plurality of exposed conductor parts of insulation-coated coil winding wire with an insulative disk member substantially of the same diameter as the inner peripheral diameter of said coil and carrying on one surface a plurality of commutator segments radially extending from the central area to the periphery of said disk member and on the other surface a rotary shaft as secured at one end thereof to the axial center of said disk member while electrically connecting respective said exposed conductor parts to each of said commutator segments, including the steps of inserting said disk member inside said cylindrical coil at a position adjacent said axial end of the coil so as to have respective said commutator segments engaged with each of said exposed conductor parts of the coil, restricting each of said axial end edges of the coil under a pressure applied in axial directions of the coil, defining a ring-shaped space on both of said surfaces of the disk member at the periphery thereof where the disk member abuts the inner periphery of the coil, and applying over the outer periphery of the coil a pressure in all radial inward directions until respective winding turns of the coil partly bulge into said ring-shaped spaces to tightly clamp the peripheral edge of the disk member while other parts of said turns are substantially flatly compressed.

2. A method according to claim 1 wherein said application of radially inward pressure is performed by means of a set of converging dies having a thickness in the axial directions of said cylindrical coil substantially equal to the axial length of the coil.

3. A method according to claim 1 which includes, prior to said inserting step, a step of providing a peripheral recess in said periphery of the disk member at respective positions where said commutator segments terminate.

4. A method according to claim 3 which further includes a step of providing a conductive layer at the bottom surface of respective said recesses so as to be continuous to each of said commutator segments.

5. A method according to claim 1 which includes, prior to said inserting step, a step of applying a hot-melting type fusion bonding agent to the entire surface of said cylindrical coil, and said radially inward pressure applying step is performed while heating the coil to a temperature enough for melting said agent.

* * * * *